(12) United States Patent
Wilhelmsson et al.

(10) Patent No.: US 8,576,766 B2
(45) Date of Patent: Nov. 5, 2013

(54) DYNAMIC SCHEDULING OF IN-BAND RELAY NODE RESOURCES

(75) Inventors: Leif Wilhelmsson, Dalby (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/220,255

(22) Filed: Aug. 29, 2011

(65) Prior Publication Data
US 2013/0051254 A1    Feb. 28, 2013

(51) Int. Cl.
*H04W 88/04* (2009.01)
(52) U.S. Cl.
USPC ........... 370/315; 370/338; 370/346; 370/350; 455/10; 455/502
(58) Field of Classification Search
USPC ............ 370/338, 318, 315, 350, 346; 455/10, 455/502
See application file for complete search history.

(56) References Cited

U.S. PATENT DOCUMENTS

| | | | |
|---|---|---|---|
| 7,876,739 | B2 | 1/2011 | Ahn et al. |
| 8,184,580 | B2 | 5/2012 | Wilhelmsson et al. |
| 2007/0110016 | A1* | 5/2007 | Shen et al. .................. 370/338 |
| 2008/0080423 | A1 | 4/2008 | Kolding et al. |
| 2008/0144552 | A1 | 6/2008 | Johansson et al. |
| 2009/0270108 | A1 | 10/2009 | Xu |
| 2009/0274100 | A1 | 11/2009 | Montojo et al. |
| 2010/0002656 | A1 | 1/2010 | Ji et al. |
| 2010/0002664 | A1 | 1/2010 | Pan et al. |
| 2010/0159935 | A1 | 6/2010 | Cai et al. |
| 2010/0216394 | A1 | 8/2010 | Shin et al. |
| 2010/0220644 | A1 | 9/2010 | Reznik et al. |
| 2010/0232345 | A1 | 9/2010 | Tsai et al. |
| 2010/0254301 | A1 | 10/2010 | Blakenship et al. |

(Continued)

FOREIGN PATENT DOCUMENTS

| | | |
|---|---|---|
| CA | 2 782 073 A1 | 4/2011 |
| WO | 2010145225 A1 | 12/2010 |
| WO | 2011/002176 A2 | 1/2011 |
| WO | 2011/053214 A1 | 5/2011 |

OTHER PUBLICATIONS

PCT International Search Report, mailed Dec. 18, 2012, in connection with International Application No. PCT/EP2012/066073.

(Continued)

*Primary Examiner* — Andrew Lai
*Assistant Examiner* — Hien Nguyen
(74) *Attorney, Agent, or Firm* — Potomac Patent Group PLLC; Kenneth B. Leffler

(57) ABSTRACT

A relay node is operated in a communication system wherein the relay node communicates with a communication system node via a first link and communicates with user equipment (UE) via a second link. The relay node detects whether a collision between its own uplink transmission on the first link and receipt of the user's transmission on the second link at a future time instant is expected to occur, wherein the collision will interfere with the relay node's ability to receive the UE's transmission. If so, then, the relay node selects and executes one of a plurality of interference averting measures, selection being based at least in part on what type of information is expected to be transmitted and received on the respective first and second links. First and second interference averting measures comprise refraining from or proceeding with transmission of some information to the communication system node.

20 Claims, 11 Drawing Sheets

(56) References Cited

U.S. PATENT DOCUMENTS

| | | |
|---|---|---|
| 2010/0272007 A1 | 10/2010 | Shen et al. |
| 2010/0284360 A1 | 11/2010 | Dalsgaard et al. |
| 2010/0297936 A1 | 11/2010 | Nan |
| 2010/0315957 A1 | 12/2010 | Koo et al. |
| 2011/0013552 A1 | 1/2011 | Ali et al. |
| 2011/0038321 A1 | 2/2011 | Kim et al. |
| 2011/0044275 A1 | 2/2011 | Ishii |
| 2011/0051654 A1 | 3/2011 | Blankenship et al. |
| 2011/0103291 A1* | 5/2011 | Wiberg et al. ........... 370/315 |
| 2012/0106437 A1* | 5/2012 | Seo et al. ............... 370/315 |

OTHER PUBLICATIONS

PCT Written Opinion, mailed Dec. 18, 2012, in connection with International Application No. PCT/EP2012/066073.

Samsung: "Full duplex configuration of Un and Uu subframes for Type I relay", 3rd Generation Partnership Project, Mobile Competence Centre; 650, Route Des Lucioles; F-06921 Sophia-Antipolis Cedex; France, vol. RAN WG1, No. Valencia, Spain; 20100118, Jan. 12, 2010, XP050417864.

Sadiq, B. et al. "Downlink Scheduling for Multiclass Traffic in LTD" EURASIP Journal on Wireless Communications and Networking, vol. 2009, Article ID 51067, 18 pages, doi: 10.1155/2009/510617, Hindawi Publishing Corporation, Jul. 30, 2009.

* cited by examiner

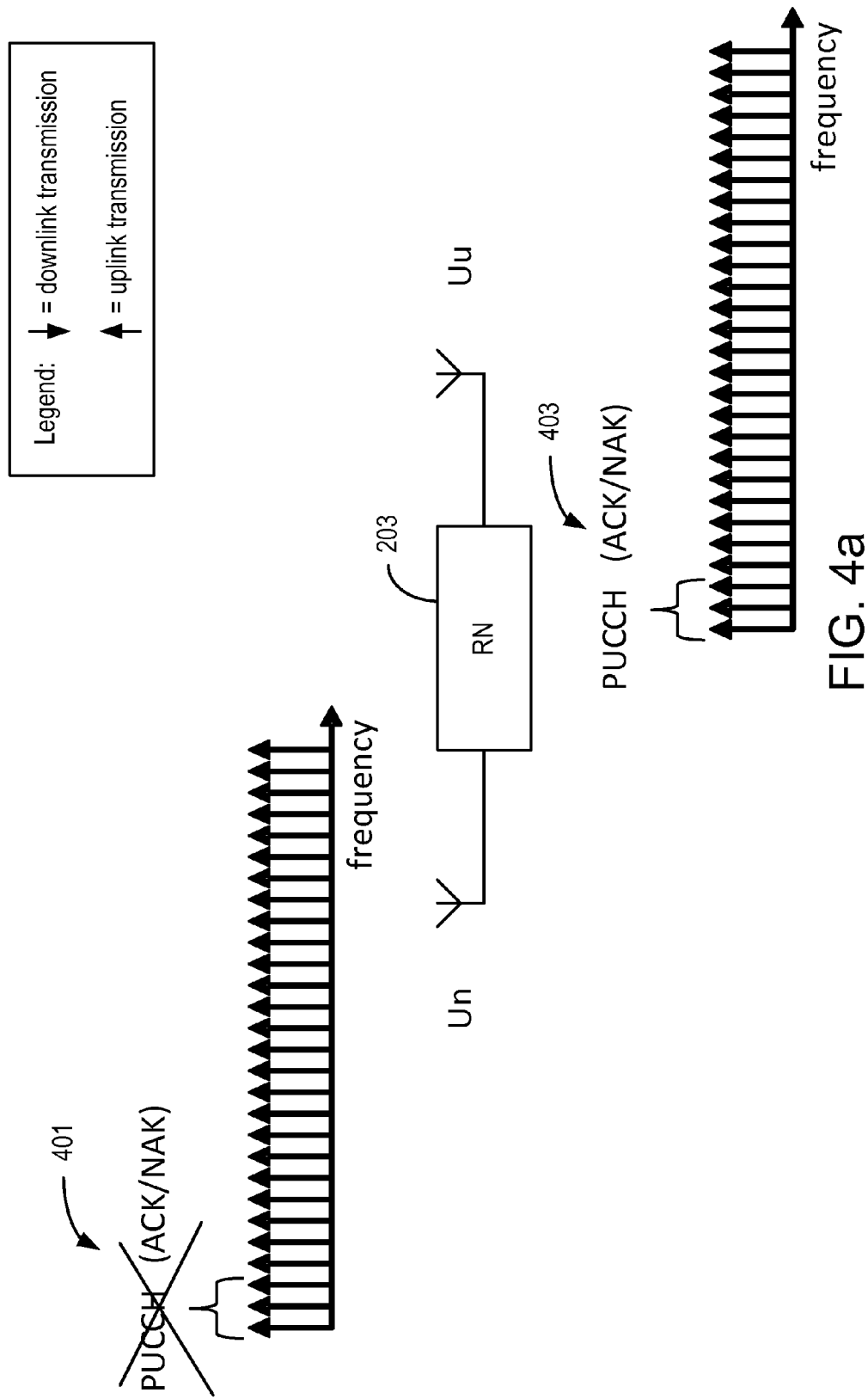

DYNAMIC SCHEDULING OF IN-BAND RELAY NODE RESOURCES

BACKGROUND

The present invention relates to cellular communication systems, and more particularly to the operation of relay nodes in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. As the mobile terminal moves from one cell to another, the network hands over responsibility for serving the mobile terminal from the presently-serving cell to the "new" cell. In this way, the user of the mobile terminal experiences continuity of service without having to reestablish a connection to the network. FIG. 1 illustrates a cellular communication system providing a system coverage area 101 by means of a plurality of cells 103.

Present-day cellular communication systems are typically based on a homogenous network, mainly consisting of large macro cells, each cell having one transmitter/radio unit that serves the entire cell. In future cellular systems, heterogeneous network architectures can be expected comprising a mix of large macro and small pico/femto cells. Furthermore, there will also be situations where a specific cell has several radio units. Such solutions make it possible to utilize advanced multiple-input-multiple-output (MIMO) technology and beam forming schemes and thereby improve the entire system spectral efficiency.

Relay Nodes (RNs) and repeaters are also sometimes deployed in a cellular communication system to give increased coverage without having to install another serving transceiver station (e.g., a base station). In the system known as the 3rd Generation Partnership Project (3GPP) Long Term Evolution (LTE), for example, an RN is intended to give increased coverage without the need to install yet another Evolved nodeB (eNB). In the down-link (DL) (i.e., the direction from eNB to the user equipment, "UE"), the RN receives the data from the eNB, decodes it, re-encodes the decoded data, and then transmits the re-encoded data to the UE. In the uplink (UL) (i.e., the direction from UE to the eNB) the corresponding procedure is done, but in the other direction instead. Although the output power of signals transmitted by a RN can be similar to those transmitted by an eNB, it is envisioned that there will be many deployments in which a significantly lower output power will suffice. When a RN is used, the eNB is referred to as a donor eNB (DeNB). The link between the DeNB and the RN is referred to as the backhaul link and commonly denoted Un, whereas the link between the RN and the UE is referred to as the access link and commonly denoted Uu.

Since a RN has two transceivers, one for each link, some care has to be taken when operating these links in order to ensure that they do not interfere with one another. In conventional systems, there are two principally different possibilities to achieve this interference avoidance. In a first alternative, the two links are caused to use different frequency bands (out-of-band relaying), in which case the coexistence between the two links is ensured by means of filtering. In a second alternative, the two links use the same frequency band (in-band relaying) but are caused to use different time-slots in a frame so that coexistence is ensured by means of scheduling.

Repeaters have similar functionality as RNs. However, the two types of devices are distinguishable from one another. One distinction is that a repeater does not decode the data and then re-encode the date that it receives from either the DeNB or UE, but rather only amplifies and then retransmits the received signal. The functionality of what is herein referred to as a "relay" is therefore commonly referred to in the art as "Decode and Forward (DF) relaying", whereas the functionality of what is herein referred to as a repeater is commonly referred to in the art as "Amplify and Forward (AF) relaying".

A repeater is often faced with the problem of having to receive a rather weak signal at the same time that it is transmitting a signal that is considerably stronger. While the power of the received signal might be on the order of −80 dBm, the power of the transmitted signal might be on the order of 0 dBm. In order to avoid self-oscillation, this puts rather hard requirements on the amount of isolation required between transmission and reception. As a rule-of-thumb, the isolation should be about 10 dB higher than the amplification of the signal. For instance, if the amplification is 80 dB, as would be the case for the example above, then the isolation should be 90 dB.

There is a fundamental difference between a repeater and a relay when it comes to the requirements on self-interference. Since a repeater does not decode the information, the requirements will be set by the quality of the transmitted (amplified) signal. For a relay, on the other hand, the received signal needs to be decoded, which means that the requirements will be determined by the requirements of the receiver in the relay.

A major problem with the existing solutions for a RN is that the two links, Un and Uu, either need to be coordinated in time, or else have to be allocated different frequencies. The former implies restrictions on the maximum data rate that can be supported as well as on the scheduling. The latter implies that twice the amount of spectrum is needed. The inventors of the subject matter described herein are aware that under certain conditions, it might be feasible for a RN to transmit on Un while receiving on Uu (and vice versa). However, this requires some means for effectively suppressing the generated interference from transmitter to receiver.

For at least the foregoing reasons, it is desirable to have improved apparatuses and methodology for performing relay functionality.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a relay node in a communication system wherein the relay node communicates with a communication system node via a first link and communicates with user equipment via a second link. Such operation includes using the second link to transmit first information to the user equipment, wherein the first information implicitly or explicitly informs the user equipment about a first uplink frequency resource that the user equipment should use during a future time interval when communicating with the relay node. Receiving and decoding second information from the communication system node is initiated, wherein the second information implicitly or explicitly informs the relay node about a second uplink frequency resource that the relay node should use when communicating with the communication system node during a time interval that at least partly overlaps with the future time interval. It is ascertained whether the relay node transmitting by means of the second uplink frequency resource during the time interval that at least partly overlaps with the future time interval will interfere with the relay node receiving a transmission from the user equipment by means of the first uplink frequency resource.

If it is ascertained that the relay node transmitting by means of the second uplink frequency resource during the time interval that at least partly overlaps with the future time interval will interfere with the relay node receiving the transmission from the user equipment, then one of a plurality of interference averting measures is selected, wherein the selection is based, at least in part, on what type of information is to be received from the user equipment by means of the first uplink frequency resource during the future time interval, and on what type of information is to be transmitted by the relay node to the communication system node by means of the second uplink frequency resource during the time interval that at least partly overlaps with the future time interval. The selected one of the plurality of interference averting measures is then executed. A first one of the interference averting measures comprises refraining from transmitting at least a subset of information to the communication system node by means of the second uplink frequency resource during the time interval that at least partly overlaps with the future time interval. A second one of the interference averting measures comprises transmitting the subset of information to the communication system node by means of the second uplink frequency resource during the time interval that at least partly overlaps with the future time interval, and performing one or more measures that are consistent with not being able to reliably receive information transmitted by the user equipment to the relay node by means of the first uplink frequency resource during the future time interval. In some but not necessarily all embodiments, the future time interval and the time interval that at least partly overlaps with the future time interval begin at a same moment in time.

In some but not necessarily all embodiments, selecting one of the plurality of interference averting measures is further based on which one of the first and second links is in a better state to accept retransmitted information. In some but not necessarily all of such embodiments, selecting one of the plurality of interference averting measures is further based on one or more of the following how many retransmissions each of the respective first and second links can tolerate; and/or a comparison of an estimation of link quality of the first link with an estimation of link quality of the second link.

In some but not necessarily all embodiments, the first one of the interference averting measures comprises refraining from transmitting data to the communication system node by means of the second uplink frequency resource during the time interval that at least partly overlaps with the future time interval; and during the time interval that at least partly overlaps with the future time interval, transmitting control information to the communication system node by means of an uplink frequency resource that is orthogonal to the first uplink frequency resource.

In some but not necessarily all embodiments, the first one of the interference averting measures comprises refraining from transmitting downlink feedback information to the communication system node by means of the second uplink frequency resource during the time interval that at least partly overlaps with the future time interval.

In some but not necessarily all embodiments, the one or more measures that are consistent with not being able to reliably receive information transmitted by the user equipment to the relay node by means of the first uplink frequency resource during the future time interval, comprise initiating retransmission of previously transmitted data to the user equipment after the future time interval.

In some but not necessarily all embodiments, the first one of the interference averting measures comprises refraining from transmitting data to the communication system node by means of the second uplink frequency resource during the time interval that at least partly overlaps with the future time interval.

In some but not necessarily all embodiments, the one or more measures that are consistent with not being able to reliably receive information transmitted by the user equipment to the relay node by means of the first uplink frequency resource during the future time interval, comprise initiating a request for retransmission of previously transmitted data by the user equipment after the future time interval.

In some but not necessarily all embodiments, the communication system operates in accordance with a Long Term Evolution standard.

BRIEF DESCRIPTION OF THE DRAWINGS

FIGS. 4a and 4b are timing diagrams illustrating a downlink/downlink collision in a system having a DeNB, a RN, and a UE, and the RN's possible collision averting measures executed in response to the collision.

DETAILED DESCRIPTION

Figure 1:
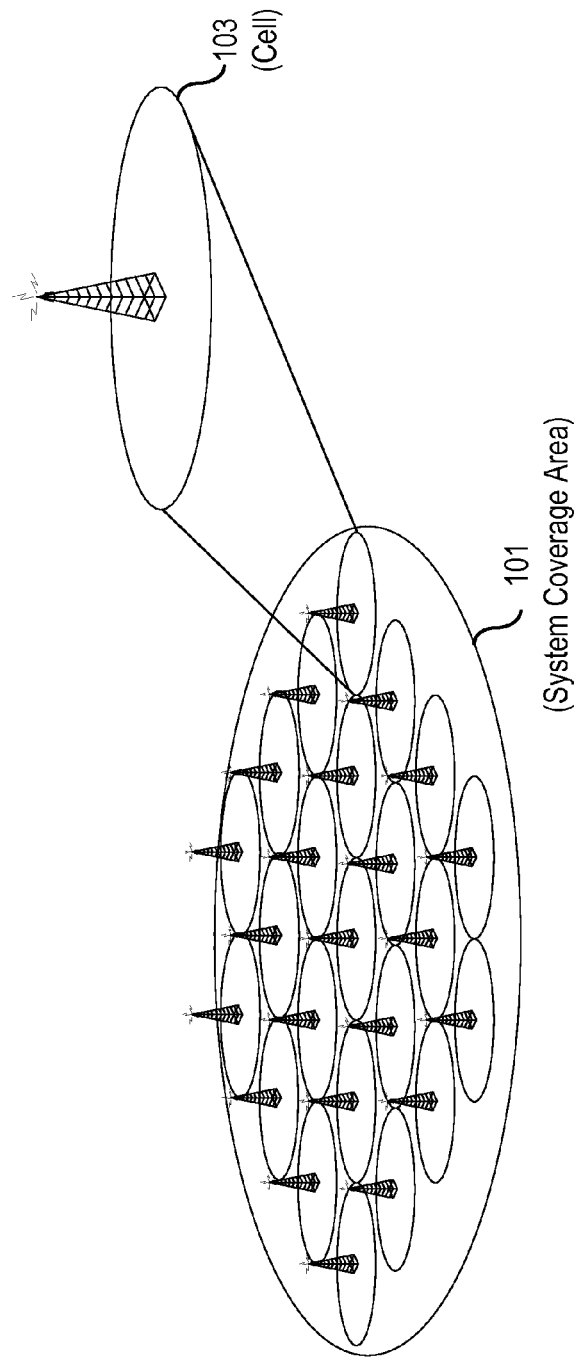
FIG. 1 illustrates a cellular communication system providing a system coverage area by means of a plurality of cells.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a RN's two links, Un and Uu, are free to use any frequencies within a same bandwidth of radiofrequency spectrum (e.g., the same 20 MHz channel). However, at any given time, the two links Un and Uu may or may not be using the same frequency/frequencies within the given bandwidth. The requirement on interference suppression is largely different if the very same frequencies are used or if only adjacent frequencies are used for the two links, with the use of different frequencies being much more advantageous (i.e., because it permits filtering to be used to reduce interference). However, a static allocation of different frequencies for the two links would effectively diminish the gain of using the same bandwidth. Thus, in accordance with an aspect consistent with embodiments of the invention, a RN schedules Uu dynamically based on an assumption that the same frequency will not be scheduled by the DeNB for the Un link. If it is determined ahead of time that this dynamic scheduling will cause a conflict, then, based on the type of collision that is expected to occur (discussed in greater detail below), the RN might discard the uplink transmission (i.e., towards the DeNB) or it might retransmit the packet to the UE (depending on, for example, respective buffer status), or in some cases the RN might discard a data transmission to the DeNB (i.e. a transmission on the PUSCH in LTE) but still transmit the ACK/NACK of previously sent DL data on the control channel (i.e. the PUCCH in LTE) which will not suffer from interference on exactly the same frequency.

These and other aspects will now be described in greater detail.

In order to facilitate the reader's understanding of various aspects of the invention, the specific features of the various embodiments are described using terminology associated with RNs defined in the 3GPP LTE release 10, where the physical layer is based on OFDM. The use of OFDM allows for a particularly simple means to share the used bandwidth (in frequency) between different units.

The various aspects of the invention are not limited to 3GPP LTE or even OFDM embodiments, however. Those of ordinary skill in the art will readily appreciate from the present description how to apply the various aspects of the invention in other contexts. Moreover, in contrast to what currently is proposed in the 3GPP LTE standard, it is here assumed that the two links of the RN are allowed to use the same channel simultaneously.

Figure 2:
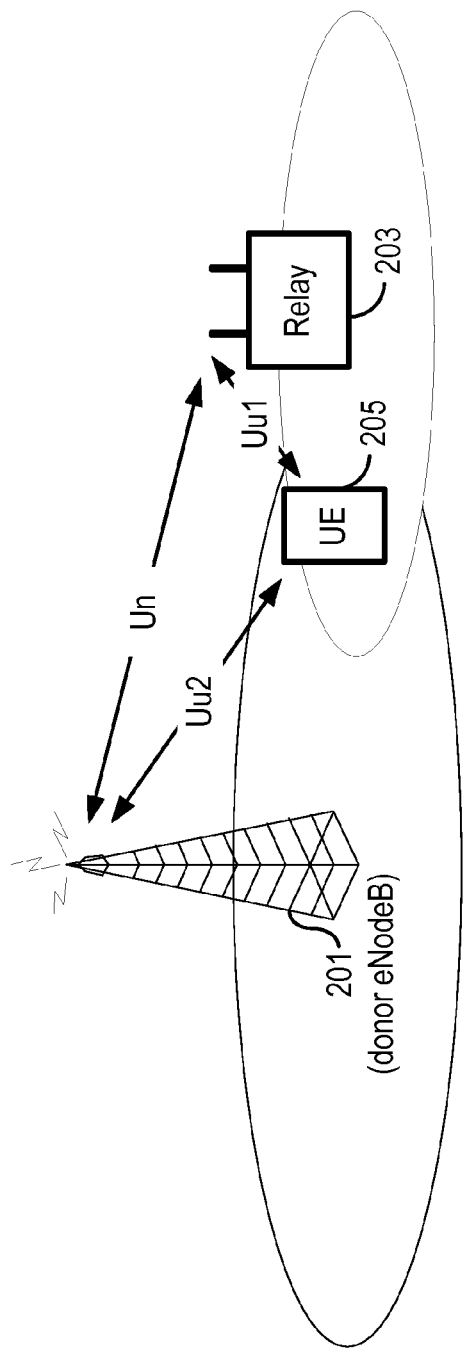
FIG. 2 is a block diagram of a deployment comprising a DeNB, a RN, and a UE.

FIG. 2 is a block diagram of a deployment comprising a DeNB 201, a RN 203, and a UE 205. As is depicted in the figure, the DeNB 201 can support both a RN (via link Un) and the UE 205 (via the link Uu2). (For sake of simplifying the description, only one UE is shown. However, in general, the DeNB 201 can support a plurality of UEs via individual links to those UEs.) The UE 205 can also be connected to the RN 203 (via the link Uu1). A UE 205 may thus be connected either to the DeNB 201 or to the RN 203, depending on what is most favorable.

For the Un link, the RN 203 acts like a UE when interacting with the DeNB 201; that is, the DeNB 201 schedules downlink packets and determines when the RN 203 can transmit and on what sub-carriers. However, the Uu link, the RN 203 acts like an eNB when interacting with the UE 205, and schedules downlink packets and determines when and on what frequencies the UE 205 can transmit. In practice, this is done such that the DeNB 201 (for the Un link) transmits downlink packet allocation and/or uplink scheduling grant on a control channel, PDCCH (in some embodiments on the R-PDCCH) to the RN 203.

Figure 3:
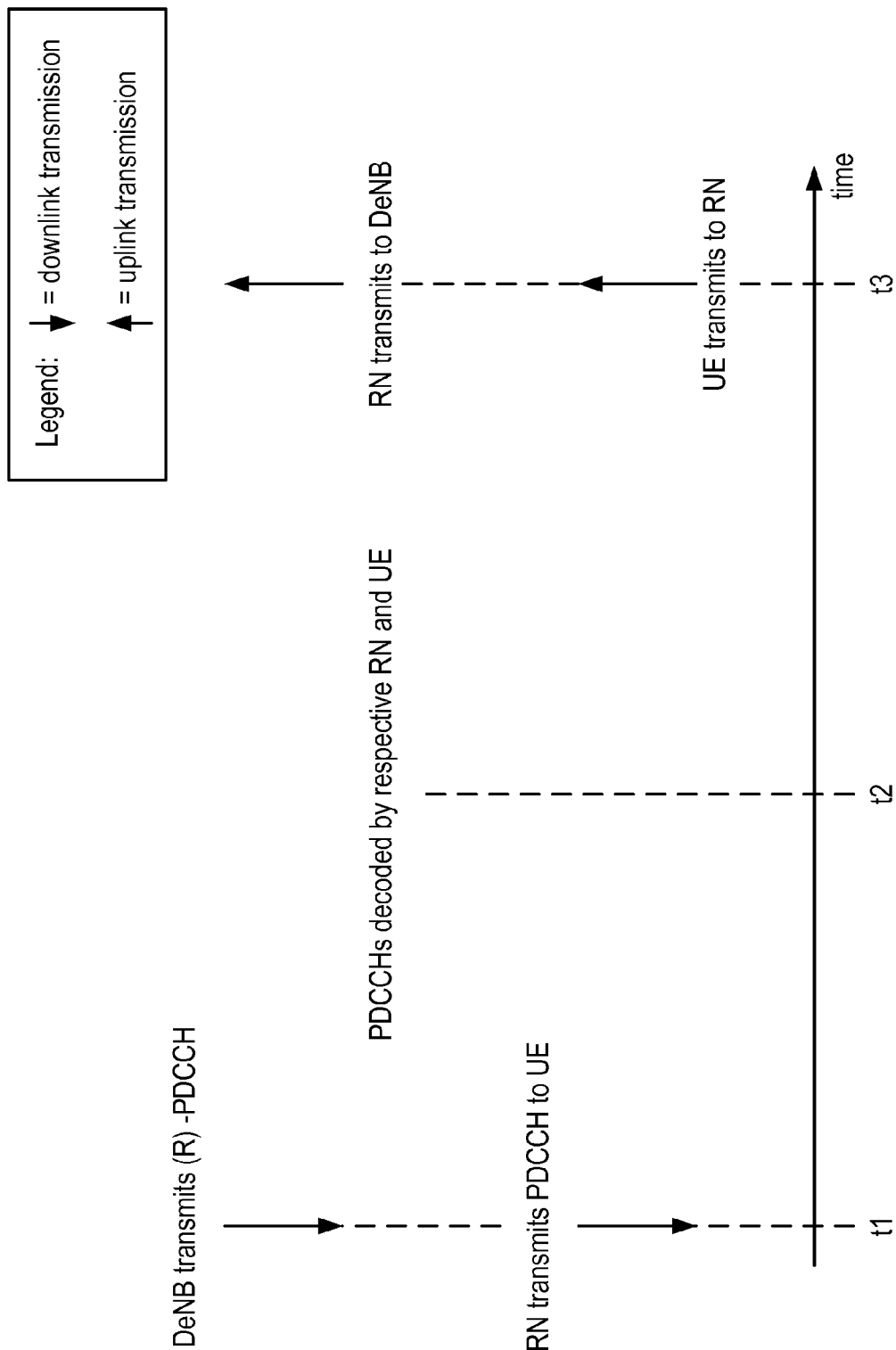
FIG. 3 is a timing diagram showing the relative timing of events between a DeNB, a RN, and a UE.

When a downlink packet has been sent by the DeNB 201, the standard calls for the RN 203 to respond with either a positive or negative acknowledgement (ACK/NACK) on an uplink control channel (Physical Uplink Control Channel—"PUCCH") 4 ms later. When the DeNB 201 schedules an uplink grant, the standard calls for the RN 203 to transmit uplink data (including possible ACK/NACK of earlier downlink data) on a shared channel (Physical Uplink Shared Channel—"PUSCH") 4 ms later. This time delay is needed for the RN 203 to demodulate and decode the Physical Downlink Control Channel (PDCCH) as well as the downlink data channel (Physical Downlink Shared Channel—"PDSCH") and also to prepare for its uplink transmission to the DeNB 201. In a similar way, the RN 203 transmits control information to the UE 205 by means of a PDCCH. This control information identifies where the downlink PDSCH is allocated as well as which possible uplink sub-carriers the UE 205 should use for uplink transmissions. If the two links are time-aligned, this results in the RN 203 needing to transmit the PDCCH to the UE 205 before it (i.e., the RN 203) has decoded its own (R)-PDCCH (the term "(R)- . . . " preceding the "PDCCH" indicates the PDCCH transmitted from the DeNB 201 to the RN 203 as opposed to one transmitted to the UE 205). FIG. 3 is a timing diagram showing the relative timing of events between the DeNB 201, the RN 203, and the UE 205. At time t1, the DeNB 201 transmits the (R)-PDCCH to the RN 203 while, at the same time, the RN 203 transmits its PDCCH to the UE 205. At time t2, the RN 203 and the UE 205 decode their respective PDCCHs. At time t3, the UE 205 transmits to the RN 203 while, at the same time, the RN 203 transmits to the DeNB 201.

Given this situation, there is a risk that the RN 203 will have requested that the UE 201 use uplink sub-carriers that it will later discover (when the access grant from the DeNB 201 is decoded at time t2) are the same ones that it has been requested to use for its own uplink transmission. The RN 203 will therefore be transmitting its own information on the same sub-carriers that it will simultaneously be trying to receive from the UE 205.

The situation may be tolerable in some scenarios, such as when the RN 203 is transmitting at a reduced output power level or when the received signal power from the UE 205 is very high. However, in other scenarios, the received signal from the UE 205 might experience too much interference when the RN 203 is transmitting at the same time. This is herein referred to as a "collision", and there are a number of different types that are distinguishable from one another.

In an aspect of embodiments consistent with the invention, the particular type of collision is identified and a corresponding action is taken. Three different collision cases that can occur in LTE and how these cases are handled according to various embodiments of the invention will now be described.

Figure 4B:
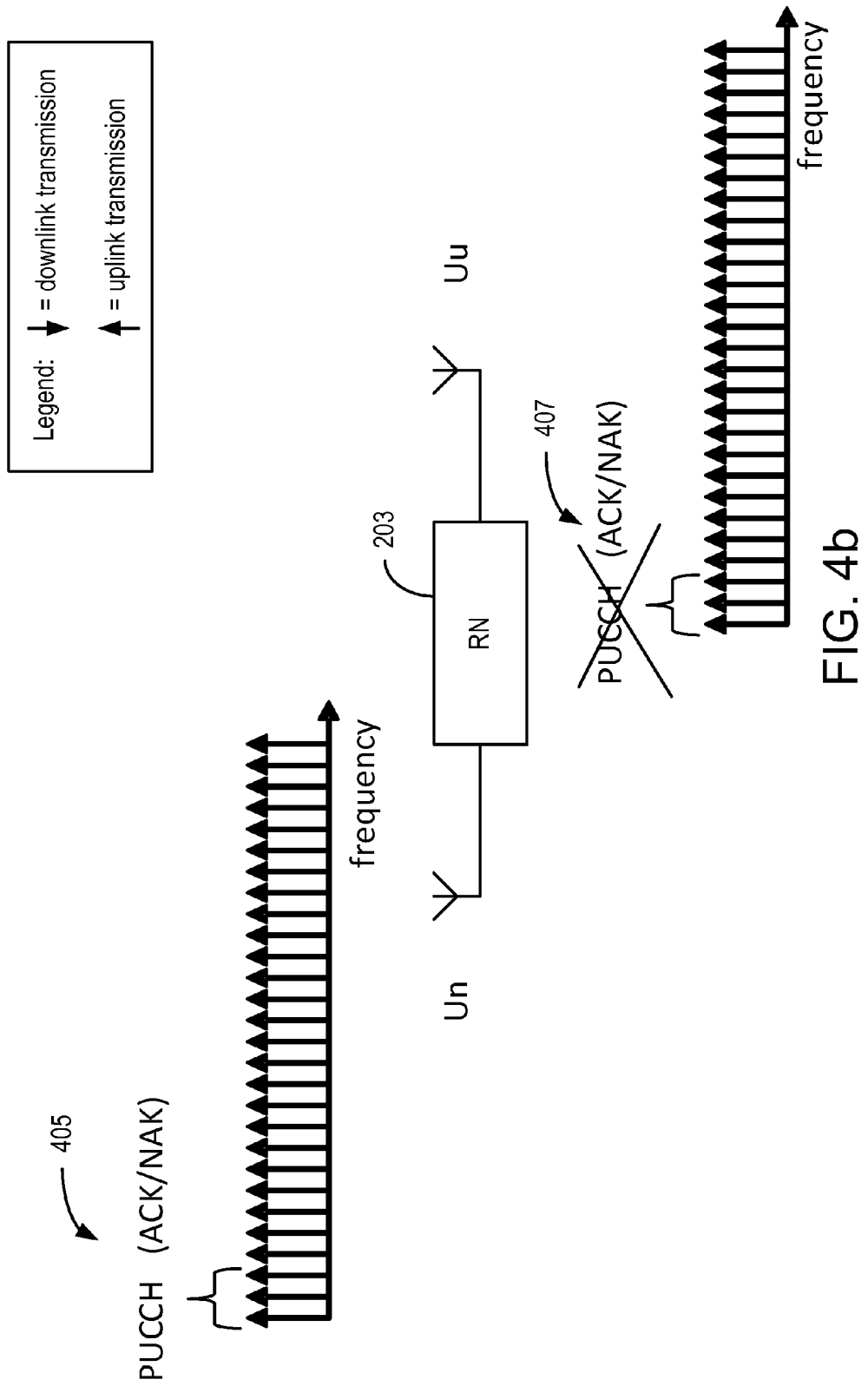

A first type of collision is referred to herein as a downlink/downlink collision, and FIGS. 4a and 4b are timing diagrams illustrating this case and the RN's possible responses. In this scenario, the DeNB 201 schedules data to be transmitted towards the RN 203 at the same time that the RN 203 will be transmitting downlink data to the UE 205. According to the standard, the RN 203 and the UE 205 should each transmit feedback ACK/NAK information 4 ms later. The frequency resource used for the ACK/NAK transmission is dependent on the specific frequency allocation used for downlink scheduling, and defined by the 3GPP standard. The control data communicated to the recipient of the downlink data informs the recipient of what the specific frequency allocation used for downlink scheduling will be. A collision occurs if both the RN 203 and the UE 205 use the same frequency resource for their respective ACK/NAK transmissions.

The RN 203 is therefore able to determine whether a collision of the ACK/NAKs will occur, and if so the RN 203 takes the following preemptive measures. The RN 203 determines the buffer status for the respective Un and Uu links to ascertain each link's tolerance for accepting a retransmission. Based on the buffer status, the RN 203 either discards the uplink ACK/NAK transmission to the DeNB 201 on the Un link (this is illustrated in FIG. 4a as the "crossed out" ACK/NAK transmission 401 on the Un link and receipt of the UE's ACK/NAK transmission 403 on the Uu link) or alternatively accepts ACK/NAK detection failure from the UE 205 (regardless of what the UE 205 is actually reporting) (this is illustrated in FIG. 4b as the ACK/NAK transmission 405 on the Un link and the "crossed out" receipt of the UE's ACK/NAK transmission 407 on the Uu link).

In the event that the RN 203 refrains from performing the uplink ACK/NAK transmission to the DeNB 201 on the Un link, the DeNB 201 will detect the discontinuous transmission (DTX) and interpret this as a missed (R)-PDCCH detection. Consequently, the DeNB 201 will retransmit the packet that the omitted ACK/NAK was associated with.

In the event that the RN 203 proceeds with its uplink ACK/NAK transmission 405 to the DeNB 201 on the Un link, it knows that it will not be able to reliably receive the UE's ACK/NAK 407 on the Uu link. It must, therefore, treat this as a detected DTX on the Uu link and respond by retransmitting the downlink packet (associated with the "lost" ACK/NAK) to the UE 205.

Regarding the RN's actions based on link buffer status, if for instance the Uu link can accept a retransmission, whereas the Un link cannot, the priority will be given to the Un link (i.e., the RN 203 will refrain from transmitting the ACK/NAK on the Uu link), and vice versa.

In alternative embodiments, more parameters can be considered to arrive at a determination of which link to give priority to. For example, and without limitation, the priority between the links can be based on the number of retransmissions that each of the respective links can tolerate, and/or the estimated link quality on each of the respective links.

Figure 5A:
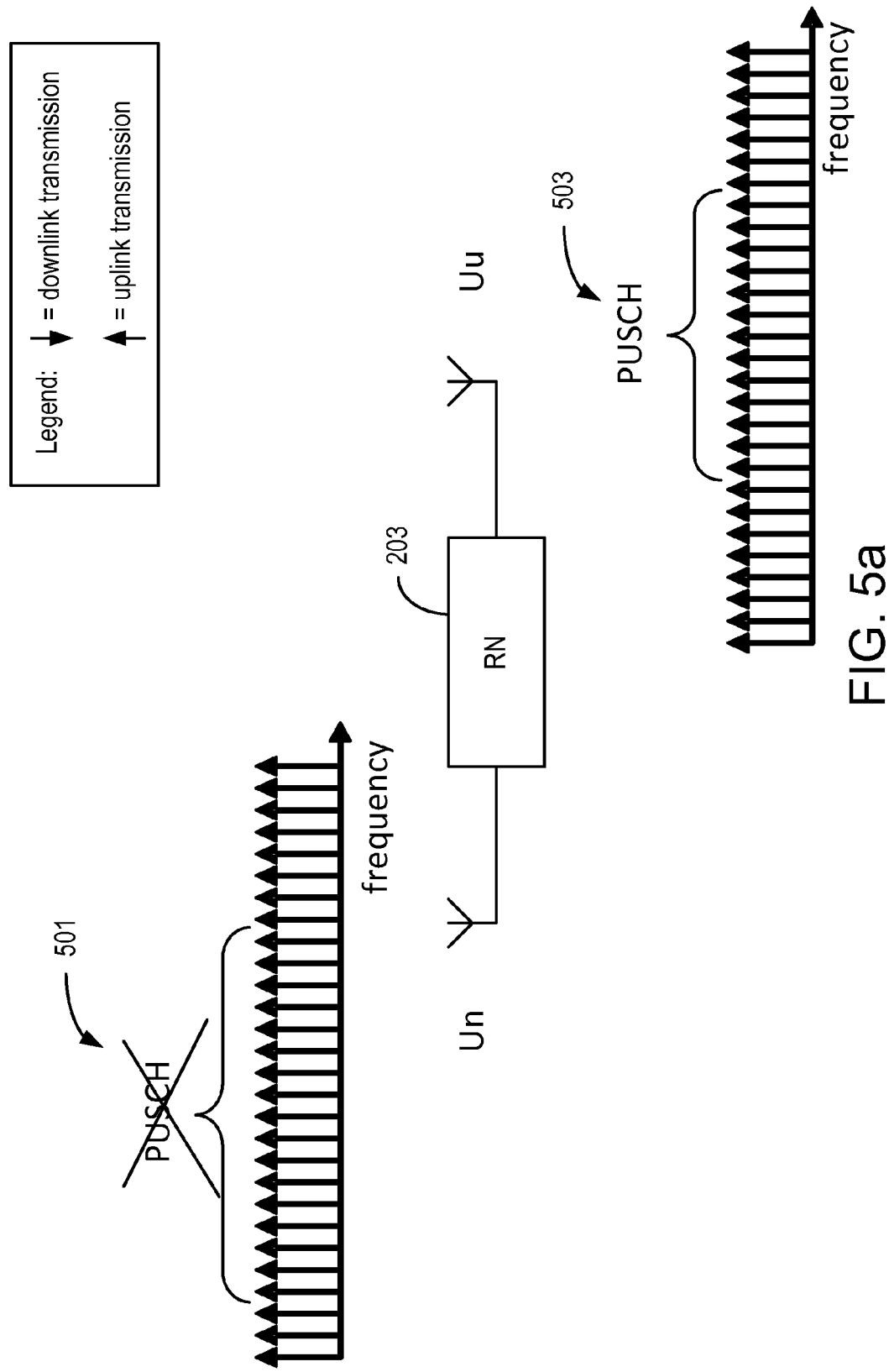
FIGS. 5a and 5b are timing diagrams illustrating an uplink/uplink collision in a system having a DeNB, a RN, and a UE, and the RN's possible collision averting measures executed in response to the collision.
Figure 5B:
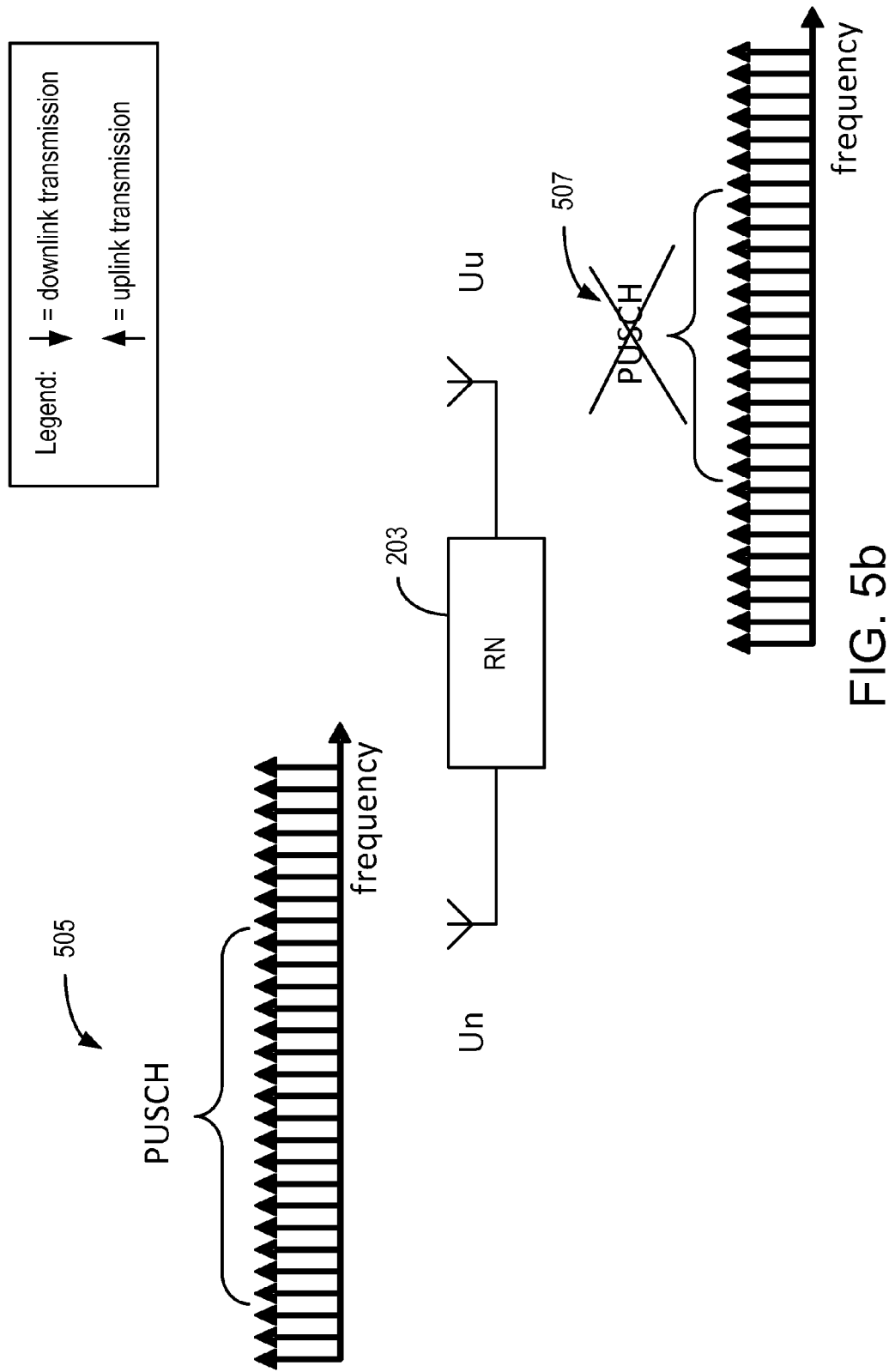

A second type of collision is referred to herein as uplink/uplink collision, and FIGS. 5a and 5b are timing diagrams illustrating this case and the RN's possible responses. In this scenario, the DeNB 201 has given the RN 203 an uplink grant on a first PDSCH frequency resource (on the Un link), and at the same time the RN 203 has transmitted to the UE 205 an uplink grant on a second PDSCH frequency resource (on the Uu link). Collision occurs once the first and second PDSCH frequency resources overlap during transmission.

Similar to downlink/downlink collision, the RN 203 is able to determine in advance that this collision will occur at some time, t+τ (where "t" is a present time, and τ is the amount of time after time t that the collision is expected to occur—in LTE-compliant systems, τ is 4 ms). To handle this situation, the RN 203 determines the buffer status for the respective Un and Uu links to ascertain each link's tolerance for accepting a retransmission. Based on the buffer status, the RN 203 either refrains from performing its own uplink transmission (on the PUSCH) (this is illustrated in FIG. 5a as the "crossed out" PUSCH transmission 501 on the Un link and receipt of the UE's PUSCH transmission 503 on the Uu link) or alternatively accepts PUSCH detection failure from the UE 205 (this is illustrated in FIG. 5b as the PUSCH transmission 505 on the Un link and the "crossed out" receipt of the UE's PUSCH transmission 507 on the Uu link).

In the event that the RN 203 refrains from performing the uplink PUSCH transmission to the DeNB 201 on the Un link, the DeNB 201 will interpret this as a missed PDCCH UL grant detection. Consequently, the DeNB 201 will transmit another PDCCH UL grant to the RN 203.

In the event that the RN 203 proceeds with its uplink PUSCH transmission 505 to the DeNB 201 on the Un link, it knows that it will not be able to reliably receive the UE's PUSCH transmission 507 on the Uu link. It must, therefore, request a retransmission from the UE 205.

Regarding the RN's actions based on link buffer status, if for instance the Uu link can accept a retransmission, whereas the Un link cannot, the priority will be given to the Un link (i.e., the RN 203 will refrain from transmitting the PUSCH on the Uu link), and vice versa.

In alternative embodiments, more parameters can be considered to arrive at a determination of which link to give priority to. For example, and without limitation, the priority between the links can be based on the number of retransmissions that each of the respective links can tolerate, and/or the estimated link quality on each of the respective links.

Figure 6:
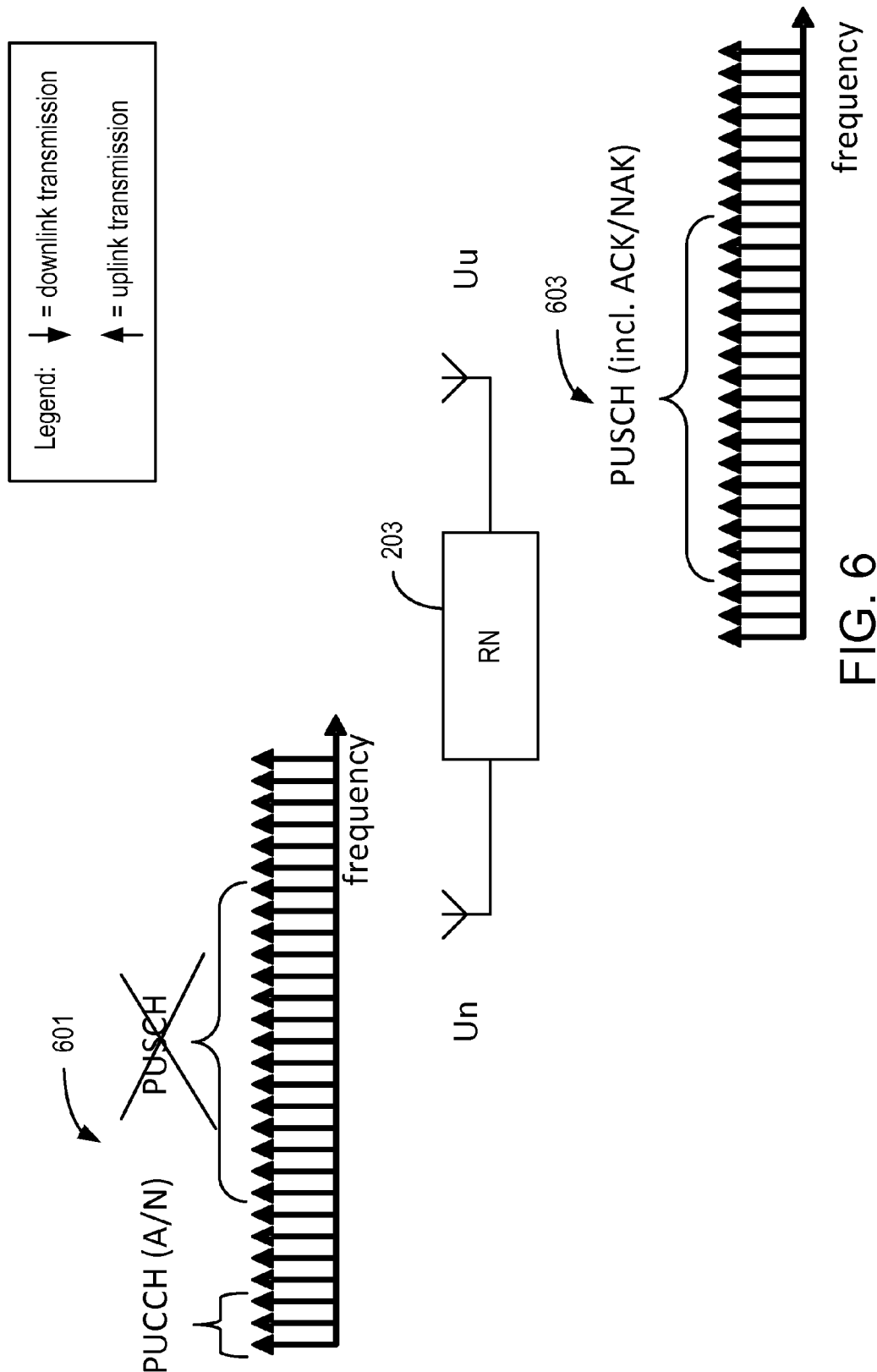
FIG. 6 is a timing diagram illustrating an uplink plus downlink collision in a system having a DeNB, a RN, and a UE, and the RN's collision averting measures executed in response to the collision.

A third type of collision is referred to herein as uplink plus downlink ("UL+DL") collision, and FIG. 6 is a timing diagram illustrating this case and the RN's response. In this scenario downlink packets as well as uplink grants are transmitted from the DeNB 201 to the RN 203 via the (R)-PDCCH, and at the same time downlink packets as well as uplink grants are transmitted from the RN 203 to the UE 205 via the PDCCH. (The UL+DL collision scenario also encompasses instances in which downlink packets as well as uplink grants are transmitted from the DeNB 201 to the RN 203 via the (R)-PDCCH, and at the same time only uplink grants, but not downlink packets, are transmitted from the RN 203 to the UE 205 via the PDCCH.) In this collision case, the downlink feedback information (i.e. ACK/NAK) is multiplexed into the uplink shared channel (PUSCH). Collision can occur in the same way as described above with respect to uplink/uplink collisions.

As with the other collision situations, the RN 203 is able to determine in advance that this collision will occur at some time, t+τ (where "t" is a present time, and τ is the amount of time after time t that the collision is expected to occur). In this case the RN 203 can solve the collision problem by refraining from performing its uplink transmission at t+τ (PUSCH on the Un link) (i.e., behaving as if it missed the uplink grant when decoding the PDCCH) (represented FIG. 6 as the "crossed out" PUSCH transmission 601 on the Un link) while receiving the UE's complete data and downlink feedback transmission (PUSCH on the Uu link) (represented in FIG. 6 as the received PUSCH transmission 603 on the Uu link).

Assuming that the PDCCH downlink data decoding was correct, the RN 203 then transmits the ACK/NAK information on the PUCCH frequency resource (associated with the downlink data frequency allocation), using a frequency that is orthogonal to the frequency resources used by the UE's PUSCH. As with the cases described above, the DeNB 201 interprets the absence of the PUSCH data as a missed uplink grant detection and responds by transmitting a new uplink grant to the RN 203.

Figure 7A:
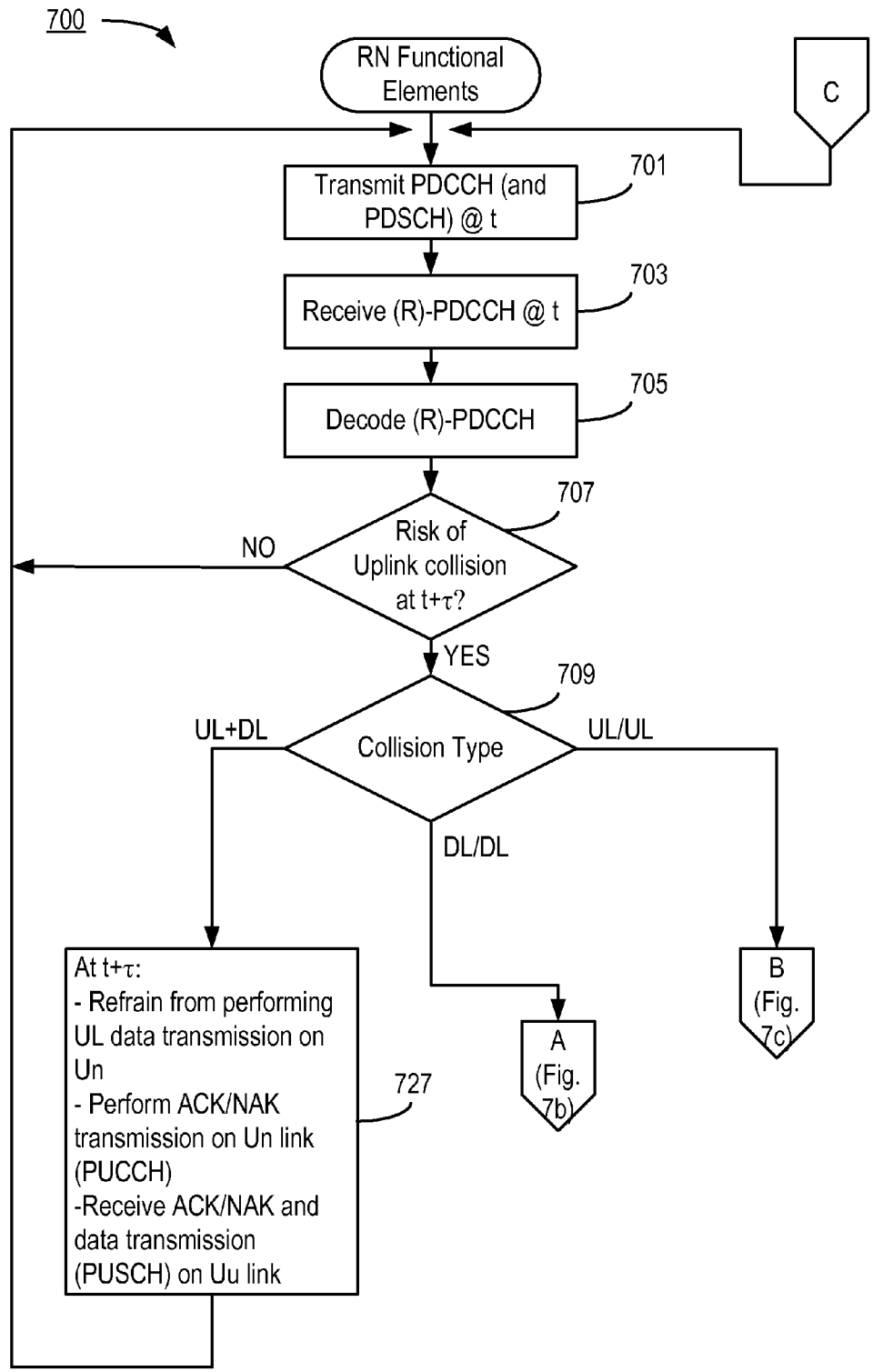
FIGS. 7a, 7b, and 7c are, together, in one respect, a flow chart of steps/processes performed by a RN in accordance with exemplary embodiments of the invention.
Figure 7B:
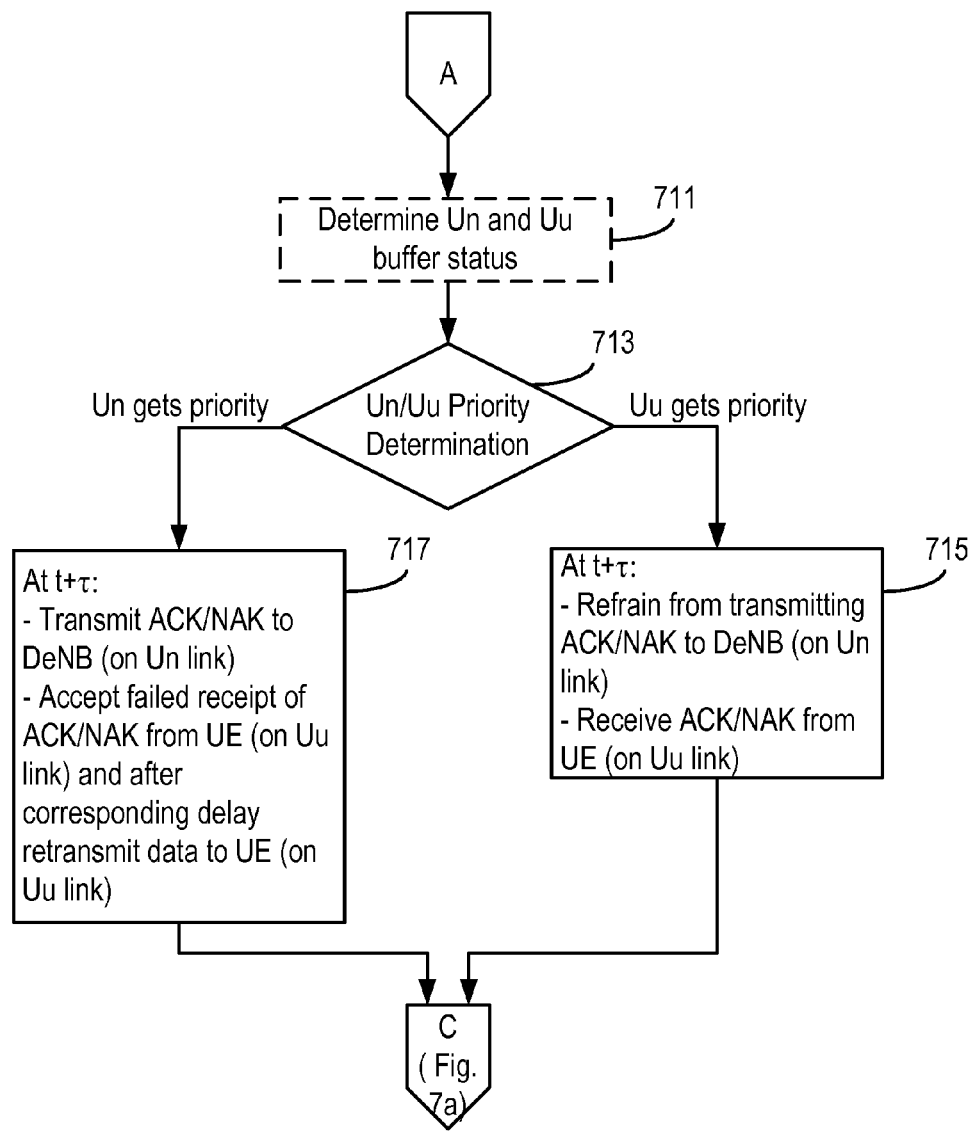
Figure 7C:
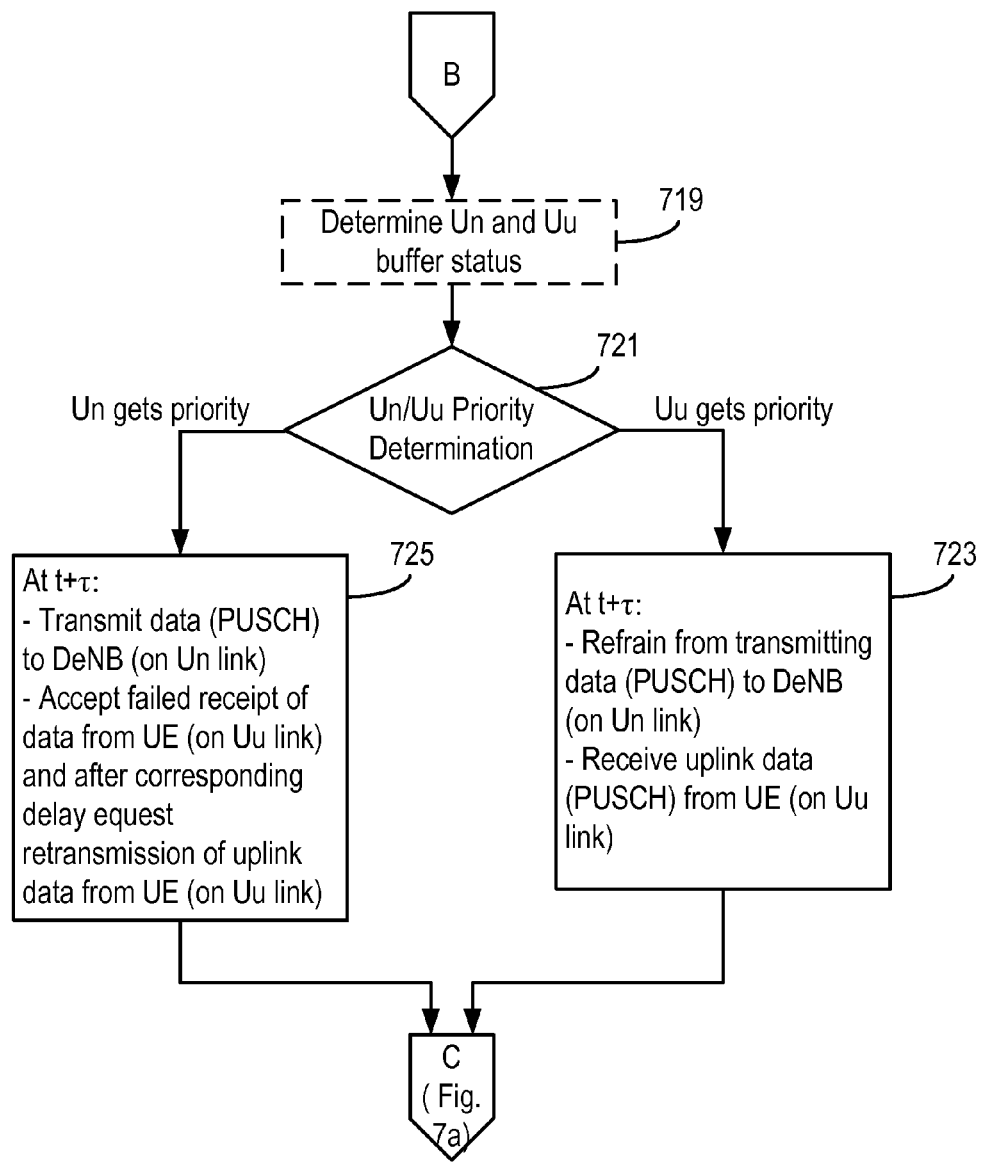

FIGS. 7a, 7b, and 7c together constitute, in one respect, a flow chart of steps/processes performed by a RN 203 in accordance with exemplary embodiments of the invention. In another respect, FIGS. 7a, 7b, and 7c together can be considered to depict exemplary means 700 comprising various circuitry configured to perform the described functions.

At the outset, the RN 203 is presumed to be connected to a DeNB 201 and also to at least one UE 205. At time t, the RN transmits the PDCCH, including possible downlink data allocation in the PDSCH, to the UE 205 and/or uplink grants (and information indicating what corresponding frequency resource to use) to the at least one UE 205 (step 701). Simultaneously (i.e., also at time t), the RN 203 receives the (R)-PDCCH (step 703). The RN 203 decodes the received (R)-PDCCH (step 705). This decoding yields the presence of corresponding possible downlink packets to the RN 203 in the PDSCH as well as possible uplink grants for RN's uplink transmission to the DeNB 201 to be performed at time t+τ.

Once the (R)-PDCCH is decoded, a control unit (e.g., hardwired circuitry, software controlled processor, or combination of both) determines whether there is a risk of uplink collisions at time t+τ (step 707) (i.e., whether at time t+τ it will be transmitting on the same frequency resource as is being used by the UE 205) (decision block 707). If not ("NO" path out of decision block 707), no collision averting measures are taken and processing returns back to step 701.

If it is detected that a collision can occur ("YES" path out of decision block 707), then it must be determined what steps to take. As explained above, the type of collision averting steps to be taken depend on the type of upcoming collision that has been detected (decision block 709). If a downlink/downlink collision is detected ("DL/DL" path out of decision block 709—see FIG. 7b), then the course of action to be followed will be based on which one of the Un and Uu links should be given priority. As described earlier, in some (but not necessarily all) embodiments, the status of the Un and Uu buffers is at least one factor, so in these embodiments this is determined (step 711—illustrated in dashed lines to indicate that this step/element may not be present in all embodiments). The extent to which each of these buffers is full indicates the extent to which a respective link can accept a retransmission. As explained earlier, other factors that may be considered include, without limitation, the priority between the links can be based on the number of retransmissions that each of the respective links can tolerate, and/or the estimated link quality on each of the respective links.

A decision is then made (e.g., based on one or more of the parameters just described) regarding which of the Un and Uu links should have priority (decision block 713). If the Uu link is to be given priority ("Uu gets priority" path out of decision block 713), then at time=t+τ, the RN 203 refrains from transmitting the downlink feedback (i.e., ACK/NAK) to the DeNB 201 on the Un link, and receives the downlink feedback from the UE 205 on the Uu link. Processing then returns to step 701 (see FIG. 7a). However, if the Un link is to be given priority ("Un gets priority" path out of decision block 713), then at time=t+τ, the RN 203 transmits the downlink feedback (ACK/NAK) to the DeNB 201 via the Un link and accepts a failure to receive the downlink feedback that was actually transmitted to the RN 203 by the UE 205. Because of this failure, the RN 203 retransmits the data to the UE 205 on the Uu link. This retransmission takes place after an additional delay (e.g., an additional τ) that is introduced to account for (1) the time during which it would have received and decoded the UE's presumed NAK and (2) retransmission preparation time. Processing then returns to step 701 (see FIG. 7a).

Returning to a consideration of decision block 709 (see FIG. 7a), iff an uplink/uplink collision is detected ("UL/UL" path out of decision block 709—see FIG. 7c), then the course of action to be followed will be based on which one of the Un and Uu links should be given priority. As described earlier, in some (but not necessarily all) embodiments, the status of the Un and Uu buffers is at least one factor, so in these embodiments this is determined (step 719—illustrated in dashed lines to indicate that this step/element may not be present in all embodiments). The extent to which each of these buffers is full indicates the extent to which a respective link can accept a retransmission. As explained earlier, other factors that may be considered include, without limitation, the priority between the links can be based on the number of retransmissions that each of the respective links can tolerate, and/or the estimated link quality on each of the respective links.

A decision is then made (e.g., based on one or more of the parameters just described) regarding which of the Un and Uu links should have priority (decision block 721). If the Uu link is to be given priority ("Uu gets priority" path out of decision block 721), then at time=t+τ, the RN 203 refrains from transmitting the data (PUSCH) to the DeNB 201 on the Un link, and receives the uplink data (PUSCH) transmitted by the UE 205 on the Uu link. Processing then returns to step 701 (see FIG. 7a).

However, if the Un link is to be given priority ("Un gets priority" path out of decision block 721), then at time=t+τ, the RN 203 transmits the data (PUSCH) to the DeNB 201 via the Un link, and accepts a failure to receive the UEs present attempt to transmit this data. Because of this failure, the RN 203 requests retransmission of the uplink data from the UE 205 on the Uu link. This request takes place after an additional delay (e.g., an additional τ) that is introduced to account for (1) the time during which it would have received and decoded the UE's data and (2) retransmission request preparation time. Processing then returns to step 701 (see FIG. 7a).

Returning to a consideration of decision block 709 (see FIG. 7a), if an uplink plus downlink collision is detected ("UL+DL" path out of decision block 709), then at time=t+τ, the RN 203 refrains from performing its uplink data transmission (PUSCH) on the Un, transmits its downlink feedback data via the Un link to the DeNB 201 on a frequency resource that is orthogonal to frequency resources being used by the UE 205, and receives the data transmission (PUSCH) including the UE's downlink feedback transmission on the Uu link (step 727). Processing then returns to step 701 (see FIG. 7a).

The invention has been described with reference to particular embodiments. However, it will be readily apparent to those skilled in the art that it is possible to embody the invention in specific forms other than those of the embodiment described above.

For example, in a number of instances above, embodiments have been described that include the relay node 203 "refraining from receiving" information from the user equipment 205. However, in alternative embodiments an equivalent result can be brought about by allowing reception of data to take place and then simply performing one or more measures that are consistent with the relay node 203 not having reliably received the information transmitted by the user equipment 205. For example, the relay node 203 could discard the received data, or in other embodiments could even store it for combination with retransmitted data in order to improve decoding performance; but in either case, the relay node 203 takes whatever steps are called for that cause the user equipment 205 to retransmit the data to the relay node 203.

It is further noted that the various embodiments described above have assumed, for the sake of simplicity, that that the Uu and Un links are synchronized with one another, and that the value of τ is the same for both the Uu and the Un links (i.e., each transmits at times t and t+τ). While this is expected to be the case in many practical embodiments, perfect synchronization between the Uu and Un links is by no means a requirement, nor is it required that the value of τ be the same for both the Uu and Un links. For example, the LTE standard sets the value of τ equal to 4 ms for both Uu and Un, but other (possibly future) standards could choose other values, such as but not limited to a 3 ms response time for the Un link and a 4 ms response time for the Uu link. Consequently, the various inventive concepts described above are not confined to application in exemplary embodiments described above. Rather the inventors have herein described solutions to the problem that arises when the relay node 203 must assign a frequency to the user equipment 205 before it (i.e., the relay node 203) has itself found out whether it has been allocated the very same frequency.

For example, consider the case in which the relay node 203 receives on the Un link at a time, t1, and transmits on the Un link at a time t1+τ1, whereas the relay node's transmission on the Uu link occurs at time t2 and its reception on the Uu link occurs at time t2+τ2. Here, t1 is permitted to, but is not required to, be equal to t2. Similarly, τ1 is permitted to, but is not required to, be equal to τ2. For example, permitting τ2 to be larger than τ1 can be a mechanism that permits lower complexity embodiments for UE (i.e., because it provides more decoding time). This might be of use, for example, for the case of machine-to-machine communication. As long as the timing is such that the relay node 203 is not able to decode what has been received from the DeNB at t1 before the relay node 203 has to transmit to the user equipment at t2, a collision can occur.

To take another example, suppose that the timing of the Un and Uu links are different from one another, for example and without limitation, by half a sub-frame (0.5 ms in an LTE system). If τ=4 ms (as specified in the LTE standard), the problem described above (i.e., the relay node 203 having to allocate a frequency to be used by the user equipment 205 before the relay node 203 itself knows what frequency it will be using) can still occur.

It will therefore be appreciated that the various embodiments described above can be considered to represent the special case in which t1=t2, and τ1=τ2.

The same strategy as described above (i.e., determining in advance whether a collision can occur and if so, what type of collision, and then based on this determination selecting and executing one of a number of interference averting measures) is applied.

The more generalized case can also be considered to occur when communication on the Un and Uu links takes place over time intervals that at least partially overlap, and in which transmission on one causes interference with respect to reception on the other. The various principles described above can therefore be applied to address this situation by means of apparatus that operates a relay node in a communication system wherein the relay node communicates with a communication system node via a first link and communicates with user equipment via a second link, such operation including:

using the second link to transmit first information to the user equipment, wherein the first information implicitly or explicitly informs the user equipment about a first uplink frequency resource that the user equipment should use during a future time interval when communicating with the relay node;

receiving and decoding second information from the communication system node, wherein the second information implicitly or explicitly informs the relay node about a second uplink frequency resource that the relay node should use when communicating with the communication system node during a time interval that at least partly overlaps with the future time interval;

ascertaining whether the relay node transmitting by means of the second uplink frequency resource during the time interval that at least partly overlaps with the future time interval will interfere with the relay node receiving a transmission from the user equipment by means of the first uplink frequency resource;

if it is ascertained that the relay node transmitting by means of the second uplink frequency resource during the time interval that at least partly overlaps with the future time interval will interfere with the relay node receiving the transmission from the user equipment, then selecting one of a plurality of interference averting measures based, at least in part, on what type of information is to be received from the user equipment by means of the first uplink frequency resource during the future time interval, and on what type of information is to be transmitted by the relay node to the communication system node by means of the second uplink frequency resource during the time interval that at least partly overlaps with the future time interval; and executing the selected one of the plurality of interference averting measures, wherein:

a first one of the interference averting measures comprises refraining from transmitting at least a subset of information to the communication system node by means of the second uplink frequency resource during the time interval that at least partly overlaps with the future time interval; and a second one of the interference averting measures comprises transmitting the subset of information to the communication system node by means of the second uplink frequency resource during the time interval that at least partly overlaps with the future time interval, and performing one or more measures that are consistent with not being able to reliably receive information transmitted by the user equipment to the relay node by means of the first uplink frequency resource during the future time interval.

It will be appreciated that the earlier-described embodiments illustrate the case in which the future time interval and the time interval that at least partly overlaps with the future time interval begin at a same moment in time (i.e., the Uu and Un links are synchronized). These embodiments additionally illustrate a subset of embodiments in which the time intervals completely overlap (thereby satisfying the description that they at least partly overlap).

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a relay node in a communication system wherein the relay node communicates with a communication system node via a first link and communicates with user equipment via a second link, the method comprising:

using the second link to transmit first information to the user equipment, wherein the first information implicitly or explicitly informs the user equipment about a first uplink frequency resource to be used by the user equipment during a future time interval when communicating with the relay node;

initiating receiving and decoding second information from the communication system node, wherein the second information implicitly or explicitly informs the relay node about a second uplink frequency resource to be used by the relay node when communicating with the communication system node during a time interval that at least partly overlaps with the future time interval;

ascertaining whether the relay node transmitting by means of the second uplink frequency resource during the time interval that at least partly overlaps with the future time interval will interfere with the relay node receiving a transmission from the user equipment by means of the first uplink frequency resource;

if it is ascertained that the relay node transmitting by means of the second uplink frequency resource during the time interval that at least partly overlaps with the future time interval will interfere with the relay node receiving the transmission from the user equipment, then selecting one of a plurality of interference averting measures based, at least in part, on what type of information is to be received from the user equipment by means of the first uplink frequency resource during the future time interval, and on what type of information is to be transmitted by the relay node to the communication system node by means of the second uplink frequency resource during the time interval that at least partly overlaps with the future time interval; and executing the selected one of the plurality of interference averting measures, wherein:

a first one of the interference averting measures comprises refraining from transmitting at least a subset of information to the communication system node by means of the second uplink frequency resource during the time interval that at least partly overlaps with the future time interval; and a second one of the interference averting measures comprises transmitting the subset of information to the communication system node by means of the second uplink frequency resource during the time interval that at least partly overlaps with the future time interval, and performing one or more measures that are responsive to the relay node not being able to reliably receive information transmitted by the user equipment to the relay node by means of the first uplink frequency resource during the future time interval, wherein the first one of the interference averting measures comprises: refraining from transmitting data to the communication system node by means of the second uplink frequency resource during the time interval that at least partly overlaps with the future time interval; and during the time interval that at least partly overlaps with the future time interval, transmitting control information to the communication system node by means of an uplink frequency resource that is orthogonal to the first uplink frequency resource.

2. The method of claim 1, wherein the future time interval and the time interval that at least partly overlaps with the future time interval begin at a same moment in time.

3. The method of claim 1, wherein selecting one of the plurality of interference averting measures is further based on which one of the first and second links is in a better state to accept retransmitted information.

4. The method of claim 3, wherein selecting one of the plurality of interference averting measures is further based on how many retransmissions each of the respective first and second links can accept.

5. The method of claim 3, wherein selecting one of the plurality of interference averting measures is further based on a comparison of an estimation of link quality of the first link with an estimation of link quality of the second link.

6. The method of claim 1, wherein the first one of the interference averting measures comprises refraining from transmitting downlink feedback information to the communication system node by means of the second uplink frequency resource during the time interval that at least partly overlaps with the future time interval.

7. The method of claim 1, wherein the one or more measures that are responsive to the relay node not being able to reliably receive information transmitted by the user equipment to the relay node by means of the first uplink frequency resource during the future time interval, comprise initiating retransmission of previously transmitted data to the user equipment after the future time interval.

8. The method of claim 1, wherein the first one of the interference averting measures comprises refraining from transmitting data to the communication system node by means of the second uplink frequency resource during the time interval that at least partly overlaps with the future time interval.

9. The method of claim 1, wherein the one or more measures that are responsive to the relay node not being able to reliably receive information transmitted by the user equipment to the relay node by means of the first uplink frequency resource during the future time interval, comprise initiating a request for retransmission of previously transmitted data by the user equipment after the future time interval.

10. The method of claim 1, wherein the communication system operates in accordance with a Long Term Evolution standard.

11. An apparatus for operating a relay node in a communication system wherein the relay node communicates with a communication system node via a first link and communicates with user equipment via a second link, the method comprising:

circuitry configured to use the second link to transmit first information to the user equipment, wherein the first information implicitly or explicitly informs the user equipment about a first uplink frequency resource to be used by the user equipment during a future time interval when communicating with the relay node;

circuitry configured to initiate receiving and decoding second information from the communication system node, wherein the second information implicitly or explicitly informs the relay node about a second uplink frequency resource to be used by the relay node when communicating with the communication system node during a time interval that at least partly overlaps with the future time interval;

circuitry configured to ascertain whether the relay node transmitting by means of the second uplink frequency resource during the time interval that at least partly overlaps with the future time interval will interfere with the relay node receiving a transmission from the user equipment by means of the first uplink frequency resource;

circuitry configured to respond to it being ascertained that the relay node transmitting by means of the second uplink frequency resource during the time interval that at least partly overlaps with the future time interval will interfere with the relay node receiving the transmission from the user equipment by selecting one of a plurality of interference averting measures based, at least in part, on what type of information is to be received from the user equipment by means of the first uplink frequency resource during the future time interval, and on what type of information is to be transmitted by the relay node to the communication system node by means of the second uplink frequency resource during the time interval that at least partly overlaps with the future time interval; and circuitry configured to execute the selected one of the plurality of interference averting measures, wherein:

a first one of the interference averting measures comprises refraining from transmitting at least a subset of information to the communication system node by means of the second uplink frequency resource during the time interval that at least partly overlaps with the future time interval; and a second one of the interference averting measures comprises transmitting the subset of information to the communication system node by means of the second uplink frequency resource during the time interval that at least partly overlaps with the future time interval, and performing one or more measures that are responsive to the relay node not being able to reliably receive information transmitted by the user equipment to the relay node by means of the first uplink frequency resource during the future time interval, wherein the first one of the interference averting measures comprises: refraining from transmitting data to the communication system node by means of the second uplink frequency resource during the time interval that at least partly overlaps with the future time interval; and during the time interval that at least partly overlaps with the future time interval, transmitting control information to the communication system node by means of an uplink frequency resource that is orthogonal to the first uplink frequency resource.

12. The apparatus of claim 11, wherein the future time interval and the time interval that at least partly overlaps with the future time interval begin at a same moment in time.

13. The apparatus of claim 11, wherein the circuitry configured to select one of the plurality of interference averting measures is further configured to base selection on which one of the first and second links is in a better state to accept retransmitted information.

14. The apparatus of claim 13, wherein the circuitry configured to select one of the plurality of interference averting measures is further configured to base selection on how many retransmissions each of the respective first and second links can accept.

15. The apparatus of claim 13, wherein the circuitry configured to select one of the plurality of interference averting measures is further configured to base selection on a comparison of an estimation of link quality of the first link with an estimation of link quality of the second link.

16. The apparatus of claim 11, wherein the first one of the interference averting measures comprises refraining from transmitting downlink feedback information to the communication system node by means of the second uplink frequency resource during the time interval that at least partly overlaps with the future time interval.

17. The apparatus of claim 11, wherein the one or more measures that are responsive to the relay node not being able to reliably receive information transmitted by the user equipment to the relay node by means of the first uplink frequency resource during the future time interval, comprise initiating retransmission of previously transmitted data to the user equipment after the future time interval.

18. The apparatus of claim 11, wherein the first one of the interference averting measures comprises refraining from transmitting data to the communication system node by means of the second uplink frequency resource during the time interval that at least partly overlaps with the future time interval.

19. The apparatus of claim 11, wherein the one or more measures that are responsive to the relay node not being able to reliably receive information transmitted by the user equipment to the relay node by means of the first uplink frequency resource during the future time interval, comprise initiating a request for retransmission of previously transmitted data by the user equipment after the future time interval.

20. The apparatus of claim 11, wherein the communication system operates in accordance with a Long Term Evolution standard.

* * * * *

UNITED STATES PATENT AND TRADEMARK OFFICE
CERTIFICATE OF CORRECTION

PATENT NO. : 8,576,766 B2  
APPLICATION NO. : 13/220255  
DATED : November 5, 2013  
INVENTOR(S) : Wilhelmsson et al.

Page 1 of 1

It is certified that error appears in the above-identified patent and that said Letters Patent is hereby corrected as shown below:

In the Specification

In Column 6, Line 48, delete "UE 201" and insert -- UE 205 --, therefor.

In Column 10, Line 6, delete "iff" and insert -- if --, therefor.

In Column 10, Lines 8-21, delete "FIG. 7c),...........respective links." and insert the same at Line 7 after "709-see" as a continuation of paragraph.

In Column 10, Lines 48-52, delete "Un link to..........(see FIG. 7a)." and insert the same at Line 47 after "via the" as a continuation paragraph.

Signed and Sealed this  
Twenty-ninth Day of July, 2014

Michelle K. Lee  
*Deputy Director of the United States Patent and Trademark Office*